United States Patent
Piriyath et al.

(10) Patent No.: US 10,924,274 B1
(45) Date of Patent: Feb. 16, 2021

(54) DETERMINISTIC DISTRIBUTION OF REKEYING PROCEDURES FOR A SCALING VIRTUAL PRIVATE NETWORK (VPN)

(71) Applicant: Juniper Networks, Inc., Sunnyvale, CA (US)

(72) Inventors: Shibu Piriyath, Bangalore (IN); Vinay Gudur, Bangalore (IN)

(73) Assignee: Junioer Networks, Inc., Sunnyvale, CA (US)

( * ) Notice: Subject to any disclaimer, the term of this patent is extended or adjusted under 35 U.S.C. 154(b) by 247 days.

(21) Appl. No.: 15/895,773

(22) Filed: Feb. 13, 2018

Related U.S. Application Data (60) Provisional application No. 62/595,867, filed on Dec. 7, 2017.

(51) Int. Cl.
*H04L 9/08* (2006.01)
*H04L 29/06* (2006.01)
*H04L 29/08* (2006.01)
*H04L 12/46* (2006.01)

(52) U.S. Cl.
CPC .......... *H04L 9/0891* (2013.01); *H04L 9/0819* (2013.01); *H04L 12/4633* (2013.01); *H04L 63/0272* (2013.01); *H04L 67/104* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 8,634,560 B1* | 1/2014 | Ng | H04L 9/0833 380/273 |
| 2001/0009025 A1* | 7/2001 | Ahonen | H04L 12/4641 713/161 |
| 2005/0215234 A1* | 9/2005 | Fukuzawa | H04M 3/38 455/411 |
| 2006/0104308 A1* | 5/2006 | Pinkerton | H04L 63/0485 370/469 |
| 2006/0212936 A1* | 9/2006 | Berzanskis | H04L 63/164 726/14 |
| 2008/0098226 A1* | 4/2008 | Zokumasui | H04L 9/0891 713/171 |
| 2008/0170692 A1* | 7/2008 | Eastham | H04L 9/0833 380/277 |
| 2009/0103724 A1* | 4/2009 | Tamai | H04L 63/0272 380/44 |

(Continued)

*Primary Examiner* — Jeffrey Nickerson
*Assistant Examiner* — Vadim Savenkov
(74) *Attorney, Agent, or Firm* — Harrity & Harrity, LLP (57) ABSTRACT

A network device may determine that network traffic for a communication session between a first peer device and a second peer device is to be protected using a security protocol suite. The network device may establish, using one or more tunnels, multiple security associations that are to be used to securely provide the network traffic of the communication session over an unsecured medium. The network device may determine a rekey scheduling time for each security association, of the multiple security associations, based on a combination of configuration information and dynamic network device information. The network device may perform, at each rekey scheduling time, a rekeying procedure to rekey each security association of the multiple security associations.

20 Claims, 6 Drawing Sheets

(56) References Cited

U.S. PATENT DOCUMENTS

| | | | |
|---|---|---|---|
| 2011/0066858 A1* | 3/2011 | Cheng | H04L 63/164 |
| | | | 713/171 |
| 2011/0188659 A1* | 8/2011 | Khalid | H04L 9/0841 |
| | | | 380/278 |
| 2011/0228934 A1* | 9/2011 | Fukuda | H04L 63/068 |
| | | | 380/255 |
| 2011/0252231 A1* | 10/2011 | Mishra | H04L 9/0891 |
| | | | 713/160 |
| 2013/0003975 A1* | 1/2013 | Fukuda | H04L 9/0838 |
| | | | 380/273 |
| 2015/0295899 A1* | 10/2015 | Chen | H04L 63/0428 |
| | | | 713/160 |
| 2016/0080424 A1* | 3/2016 | Hasegawa | H04W 12/00 |
| | | | 726/1 |
| 2018/0139047 A1* | 5/2018 | Woods | H04L 9/3268 |
| 2019/0171823 A1* | 6/2019 | Maluf | G06F 21/577 |

* cited by examiner

DETERMINISTIC DISTRIBUTION OF REKEYING PROCEDURES FOR A SCALING VIRTUAL PRIVATE NETWORK (VPN)

RELATED APPLICATIONS

This application claims priority under 35 U.S.C. § 119 to U.S. Provisional Patent Application No. 62/595,867, filed on Dec. 7, 2017, the contents of which are incorporated by reference herein in their entirety.

BACKGROUND

To protect network traffic, a network security protocol may be used to encrypt and protect packets of a communication session. For example, Internet Protocol Security (IPsec) is a protocol suite for securing Internet Protocol (IP) communications by authenticating and encrypting each IP packet of a communication session. IPsec includes protocols, often called security associations, for establishing mutual authentication between devices at the beginning of the communication session and negotiation of cryptographic keys to be used during the communication session.

SUMMARY

According to some possible implementations, a network device may include one or more memories and one or more processors to determine that network traffic for a communication session between a first peer device and a second peer device is to be protected using a security protocol suite. The network device may be in a first network with the first peer device, where the network device may provide the network traffic over an unsecured medium to another network device that is in a second network with the second peer device. The network device may establish, with the other network device and by using one or more tunnels, multiple security associations that are to be used to securely provide the network traffic of the communication session over the unsecured medium. The network device may determine a rekey scheduling time for each security association, of the multiple security associations, based on configuration information and dynamic network device information. The network device may perform, at each rekey scheduling time, a rekeying procedure to rekey each security association of the multiple security associations.

According to some possible implementations, a non-transitory computer-readable medium may store instructions that, when executed by one or more processors, cause the one or more processors to determine that network traffic for a communication session between a first peer device and a second peer device is to be protected using a security protocol suite. The one or more instructions may cause the one or more processors to establish, using one or more tunnels, multiple security associations that are to be used to securely provide the network traffic of the communication session over an unsecured medium. The one or more tunnels may be part of a set of active tunnels that support additional communication sessions. The one or more instructions may cause the one or more processors to determine a rekey scheduling time for each security association, of the multiple security associations, based on configuration information and dynamic network device information. The dynamic network device information may include an active tunnels count indicating a total number of tunnels included in the set of active tunnels. The one or more instructions may cause the one or more processors to perform, at each rekey scheduling time, a rekeying procedure to rekey each security association of the multiple security associations.

According to some possible implementations, a method may include determining, by a network device, that network traffic for a communication session between a first peer device and a second peer device is to be protected using a security protocol suite. The method may include establishing, by the network device and by using one or more tunnels, multiple security associations that are to be used to securely provide the network traffic of the communication session over an unsecured medium. The method may include determining, by the network device, a rekey scheduling time for each security association, of the multiple security associations, based on a combination of configuration information and dynamic network device information. The method may include performing, by the network device and at each rekey scheduling time, a rekeying procedure to rekey each security association of the multiple security associations.

DETAILED DESCRIPTION

The following detailed description of example implementations refers to the accompanying drawings. The same reference numbers in different drawings may identify the same or similar elements.

To protect network traffic, a network security protocol, such as Internet Protocol Security (IPsec), may be used to encrypt and protect packets of a communication session. IPsec may use a security association to establish authentication between devices at the beginning of the communication session and to negotiate cryptographic keys to be used during the communication session.

For security reasons, the cryptographic keys should be used for only a limited time period. For example, a rogue user (e.g., a hacker) could use an algorithm to successfully identify a cryptographic key if the rogue user had enough time to use the algorithm to test all possible combinations. As such, a concept referred to as "rekeying" may be used to replace a security association between network devices before an expiration of a set time period. In this way, the cryptographic keys may be recycled before the rogue user is able to identify the cryptographic keys.

However, in some cases, a network device of a virtual private network (VPN) may support a scaling number of communication sessions. For example, the network device may establish, with another network device in the VPN, thousands of tunnels, tens of thousands of tunnels, or more, to support network traffic flow of the communication session (e.g., via an unsecured medium, such as the Internet). In this case, the network device might be tasked with performing thousands, tens of thousands, or more, rekeying procedures to rekey key security associations relating to each tunnel. This may utilize a large amount of processing resources of the network device, utilize a large number of network resources needed to perform the rekeying procedures, cause a central processing unit (CPU) spike during intervals when a large number of security associations are being rekeyed concurrently, cause tunnels to crash during the rekeying process, and/or the like.

Some implementations described herein provide a network device to use dynamic information for determining rekey scheduling times to manage a distribution of rekeying procedures in a scaling VPN. For example, the network device may determine that network traffic for a communication session between a first peer device and a second peer device is to be protected using a security protocol suite (e.g., IPsec). In this case, the network device may establish, using one or more tunnels, multiple security associations that are to be used to securely provide the network traffic of the communication session over an unsecured medium.

Additionally, the network device may determine a rekey scheduling time for each security association, of the multiple security associations, using a scheduling optimization technique that includes dynamic network device information for the network device, such as a tunnel setup rate. Furthermore, the network device may perform, at each rekey scheduling time, a rekeying procedure to rekey a security association.

In this way, the first network device reduces CPU spikes by reducing a number of intervals where a large number of security associations are being rekeyed, reduces a number of tunnels that may crash while a rekeying procedure is being performed, conserves processing resources that might otherwise be used to execute error correction techniques after a tunnel crashes, conserves network resources that would be used to perform a larger quantity of rekeying procedures, and/or the like.

Figure 1A:
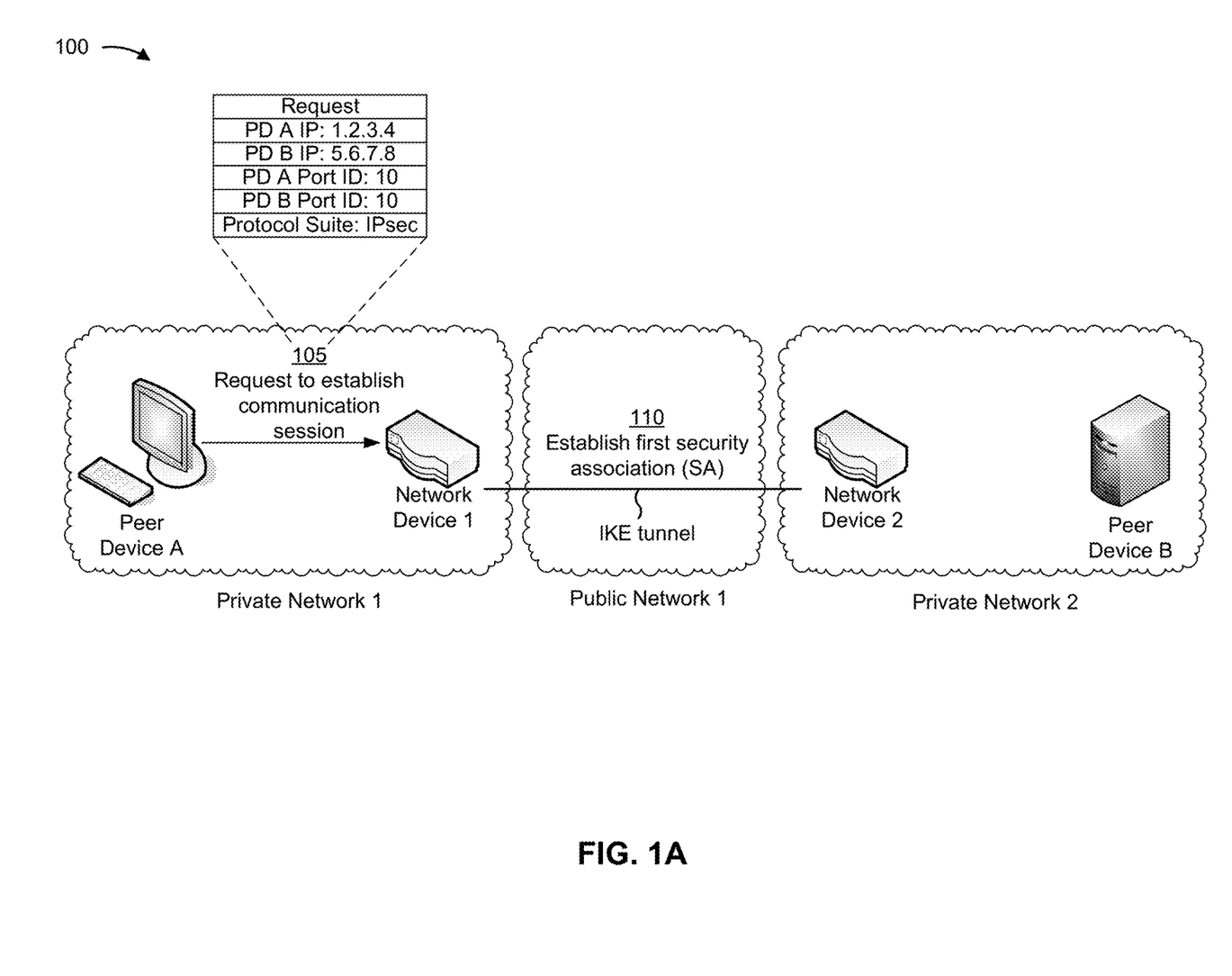
FIGS. 1A-1C are diagrams of an overview of an example implementation described herein.
Figure 1B:
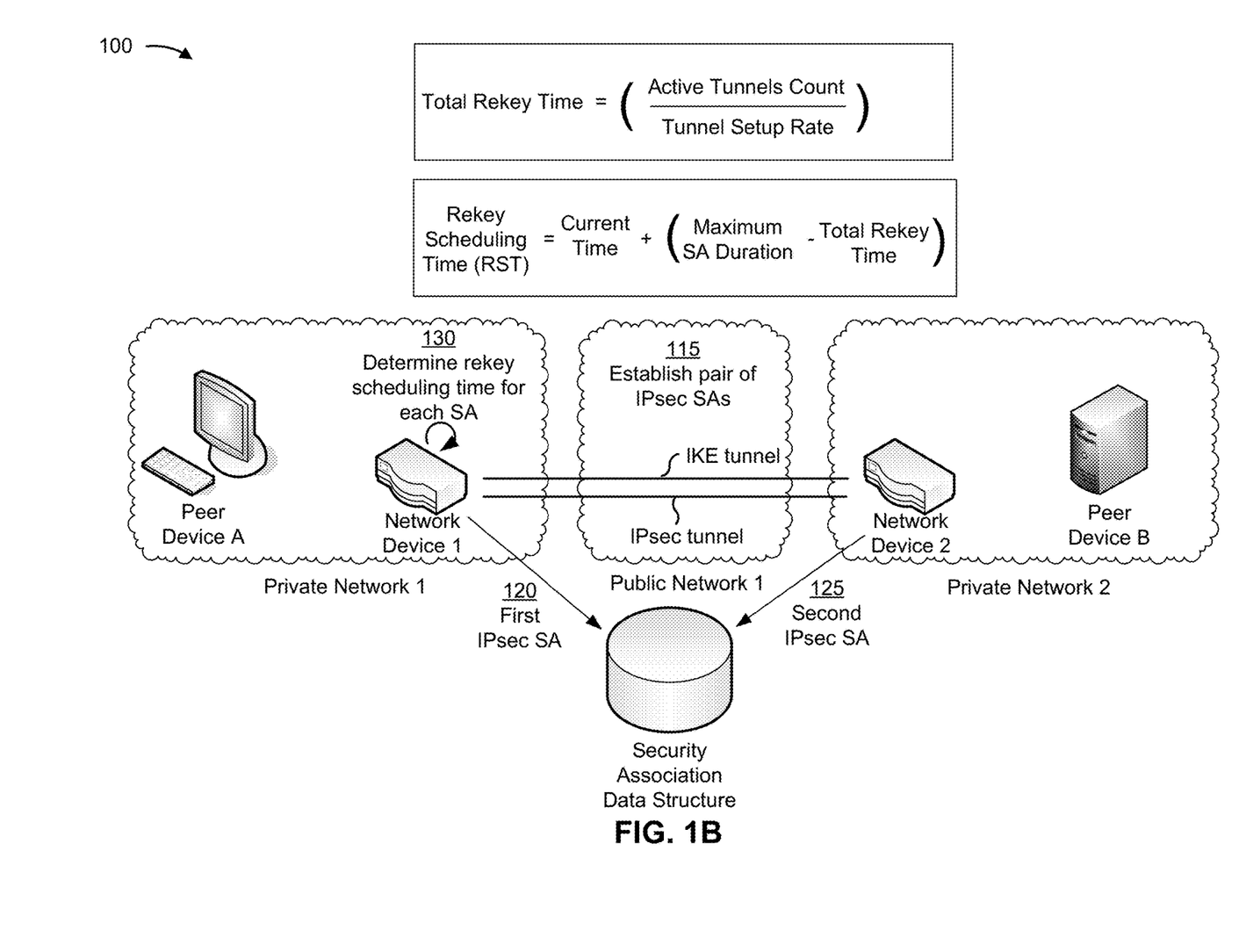
Figure 1C:
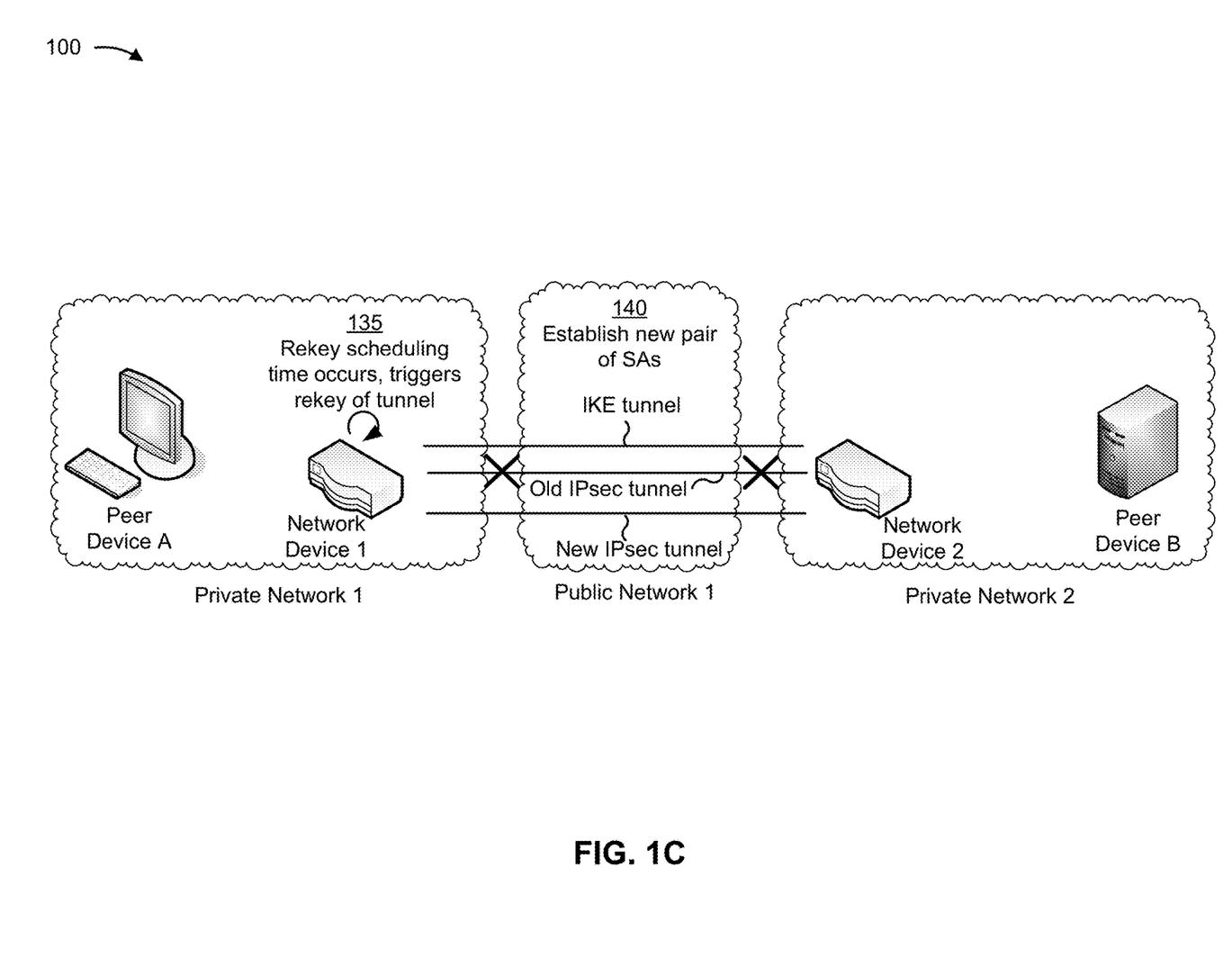

FIGS. 1A-1C are diagrams of an overview of an example implementation 100 described herein. As shown in FIGS. 1A-1C, example implementation 100 shows how network devices in a VPN are able to use dynamic information to determine rekey scheduling times, thereby ensuring that a distribution of rekeys is efficiency spread throughout an interval. For example, the VPN may include a first peer device (shown as Peer Device A) and a first network device (shown as Network Device 1) included in a first private network (shown as Private Network 1), a second network device (shown as Network Device 2) and a second peer device (shown as Peer Device B) included in a second private network (shown as Private Network 2), where the first private network and the second private network are separated by an unsecured medium (shown as Public Network 1).

As shown in FIG. 1A, and by reference number 105, the first network device may receive, from the first peer device, a request to establish a communication session. The request may include IP address information (e.g., a source IP address, a destination IP address), port information (e.g., a source port identifier, a destination port identifier, etc.), protocol suite information identifying a particular protocol suite (e.g., an internet protocol security (IPsec) protocol suite), and/or the like.

As shown by reference number 110, the first network device may establish a first security association with the second network device. For example, the first network device may perform an internet key exchange (IKE) Phase 1 procedure with the second network device to establish a first security association, such as an IKE security association. In this case, the first network device may begin the IKE Phase 1 procedure by performing an authentication procedure, where each network device confirms that the other network device has a pre-shared key, a digital certificate, and/or a similar type of authentication information that is available only to network devices included in the VPN.

Additionally, the first network device may establish a first tunnel, such as an internet key exchange (IKE) tunnel. The first tunnel may be a secure tunnel that is used to negotiate the first security association. The first security association may include security policy information that may be used for establishing a second tunnel that may be used to protect (e.g., encrypt and encapsulate, decrypt and decapsulate, etc.) the network traffic of the communication session. The security policy information may include policy name information, authentication information, encryption information, information relating to a Diffie-Hellman Group, and/or the like.

In this way, the first network device and the second network device are able to establish a first security association.

As shown in FIG. 1B, and by reference number 115, the first network device may establish a pair of security associations that may be used to protect the network traffic of the communication session. For example, the first network device and the second network device may perform an IKE Phase 2 procedure to establish a pair of security associations, such as a pair of IPsec security associations. In this case, the first network device may establish a second tunnel (e.g., an IPsec tunnel) for sending and/or receiving network traffic of the communication session, and may establish the pair of security associations for protecting the network traffic.

The pair of security associations may each include one or more cryptographic keys that may be used for encryption and/or decryption and encapsulation and/or decapsulation of the network traffic associated with the communication session. The pair of security associations may include a first security association (e.g., a first IPsec security association) that may be used to secure a first network traffic flow from the first peer device to the second peer device and a second security association (e.g., a second IPsec security association) that may be used to secure a second network traffic flow from the second peer device to the first peer device.

As shown by reference number 120, the first network device may provide the first security association (e.g., the first IPsec security association), of the pair of security associations, to a security association data structure. As shown by reference number 125, the second network device may provide the second security association (e.g., the second IPsec security association), of the pair of security associations, to the security association data structure.

As shown by reference number 130, the first network device may determine a rekey scheduling time for each security association. For example, the first network device may determine a rekey schedule time for the first security association (e.g., the IKE security association), and may determine another rekey schedule for the pair of security associations (e.g., the first and second IPsec security associations). The rekey scheduling time may be a value identifying a time at which the first network device is to execute a rekeying procedure to establish a new security association.

In some implementations, the first network device may determine a rekey scheduling time using a scheduling optimization technique that uses configuration information and dynamic network device information of the first network device. The configuration information may include a tunnel setup rate and a maximum security association duration. The tunnel setup rate may be a value indicating a number of tunnels (e.g., a maximum number of tunnels) that may be rekeyed by the first network device during a particular time period. The maximum security association duration may be a value indicating a recommended limit on a time that a security association is to be used before a rekeying procedure is to be performed. The dynamic network device information may include an active tunnels count, which may be a value indicating a total number of active tunnels being supported by the first network device.

As shown, the first network device may determine a rekey scheduling time by determining a total rekey time (e.g., where the total rekey time is calculated by dividing an active tunnels count by a tunnel setup rate), subtracting the total rekey time from the maximum security association duration to determine a total time until a rekeying procedure is to be performed, and adding the total time until the rekeying procedure is to be performed to a current time. In this case, determining the rekey scheduling time using a dynamic value, such as the active tunnels count, ensures that a distribution of rekey scheduling times for the VPN is more evenly distributed than determining rekey scheduling times using a static value.

In this way, the first network device is able to use a dynamic value to determine a rekey scheduling time for each security association, thereby conserving processing resources relative to using a static value to determine a rekey scheduling time for each security association.

As shown in FIG. 1C, and by reference number 135, a rekey scheduling time for the pair of security associations may occur, which may cause the first network device to perform a rekeying procedure. For example, a current time may match a rekey scheduling time for the pair of security associations, which may cause the first network device to perform a rekeying procedure to rekey the pair of security associations.

As shown by reference number 140, the first network device may establish a new pair of security associations (e.g., a new pair of IPsec security associations), in the same manner as described elsewhere herein. Additionally, the first network device may use the scheduling optimization technique to determine a new rekey scheduling time for the pair of new security associations. Furthermore, the first network device may rekey the first security association (e.g., the IKE security association) when a current time matches a rekey scheduling time associated with the first security association.

In this way, the first network device is able to rekey a security association at a rekey scheduling time that is not overscheduled, thereby efficiently and effectively utilizing processing resources and network resources.

As indicated above, FIGS. 1A-1C are provided merely as an example. Other examples are possible and can differ from what was described with regard to FIGS. 1A-1C. For example, while implementations described herein establish security associations using internet key exchange (IKE), other implementations may dynamically determine rekey scheduling time values using other security protocols, such as an internet security association and key management protocol (ISAKMP), Kerberized Internet Negotiation of Keys (KINK), and/or the like.

Furthermore, there can be additional devices and/or networks, fewer devices and/or networks, different devices and/or networks, or differently arranged devices and/or networks than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of example implementation 100 can perform one or more functions described as being performed by another set of devices of example implementation 100.

Figure 2:
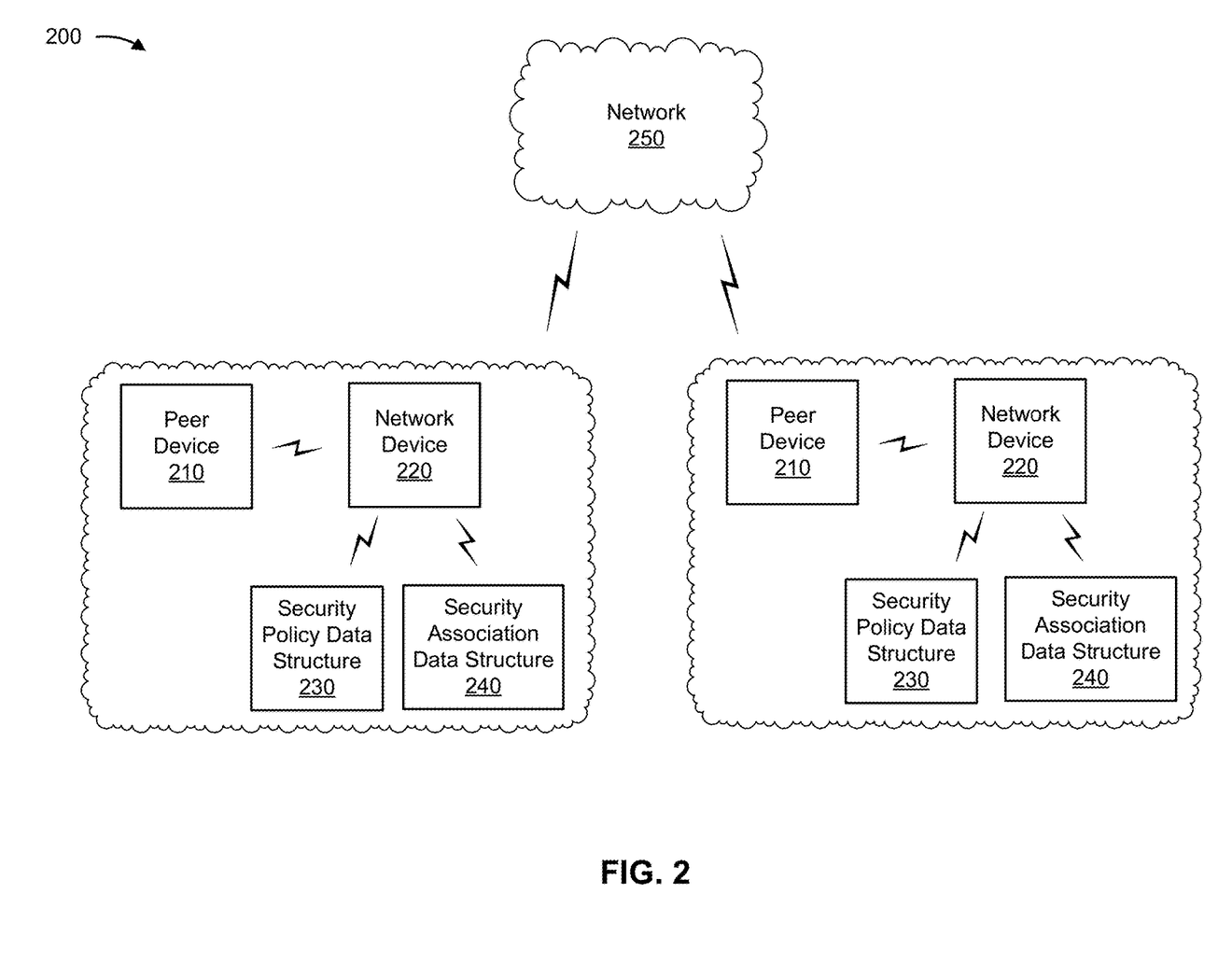
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a peer device 210, a network device 220, a security policy data structure 230, a security association data structure 240, and/or a network 250. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a switch, a gateway, a firewall, a hub, a bridge, a reverse proxy device, a server device (e.g., a proxy server, a server executing a virtual machine, etc.), a security device, an intrusion detection device, a load balancer device, or a similar device.

In some implementations, peer device 210 may include an endpoint device, such as a computer device, that is a source or a destination for network traffic. In some implementations, peer device 210 may provide a request to establish a communication session to network device 220. In some implementations, peer device 210 may provide network traffic associated with the communication session to network device 220. In some implementations, peer device 210 may receive network traffic associated with the communication session from network device 220.

Network device 220 includes one or more devices (e.g., one or more traffic transfer devices) capable of processing and transferring network traffic between peer devices 210. For example, network device 220 may include a router, a switch, a gateway, a firewall, a hub, a bridge, a reverse proxy device, a server device (e.g., a proxy server, a server executing a virtual machine, etc.), a security device, an edge device, an intrusion detection device, a load balancer device, or a similar device. In some implementations, network device 220 may be a physical device implemented within a housing, such as a chassis. In implementations, network device 220 may be a virtual device implemented by one or more computer devices of a cloud computing environment or a data center.

In some implementations, network device 220 may protect network traffic (e.g., via authentication, encryption, etc.) using a security protocol suite, such as IPsec. In some implementations, a first network device may provide, over an unsecured medium (e.g., network 250, such as the Internet), protected network traffic to a second network device 220. For example, the first network device 220 and the second network device 220 may be included in separate private networks, and may be separated by an unsecured public network (e.g., network 250). In this case, a virtual private network (VPN) may be used to support network traffic over the unsecured public network. In some implementations, network device 220 may use security policy data structure 230 and/or security association data structure 240 to assist with protecting network traffic.

Security policy data structure 230 may include one or more devices capable of storing security policies, such as IPsec policies. For example, security policy data structure 230 may include a memory device, a server device, a memory of network device 220, and/or the like. In some implementations, security policy data structure 230 may be local to or remote from network device 220. In some implementations, security policy data structure 230 may store IPsec policies, which may include security policy information indicating whether to (and how to) protect network traffic using IPsec. In some implementations, network device 220 may use the security policy information stored by security policy data structure 230 to determine whether to (and how to) protect network traffic using IPsec.

Security association data structure 240 may include one or more devices capable of storing security associations for network traffic. For example, security association data structure 240 may include a memory device, a server device, a memory of network device 220, and/or the like. In some implementations, security association data structure 240 may be local to or remote from network device 220. In some implementations, security association data structure 240 may store security associations, which may include shared security parameters to support secure communication between devices (e.g., between network device 220 and peer device 210, between network devices 220, between peer devices 210, etc.). For example, a security association may include parameters, such as a cryptographic algorithm to be used to secure network traffic, a network traffic encryption key, and/or the like. A security association may be applied to network traffic associated with particular network layer information and/or transport layer information, such as a particular source IP address, a particular destination IP address, and/or the like. Security association data structure 240 may store information that associates security association parameters and network traffic associated with particular network layer information and/or transport layer information to permit secure communication of the network traffic.

Network 250 may include one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, such as a virtual private network (VPN), an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
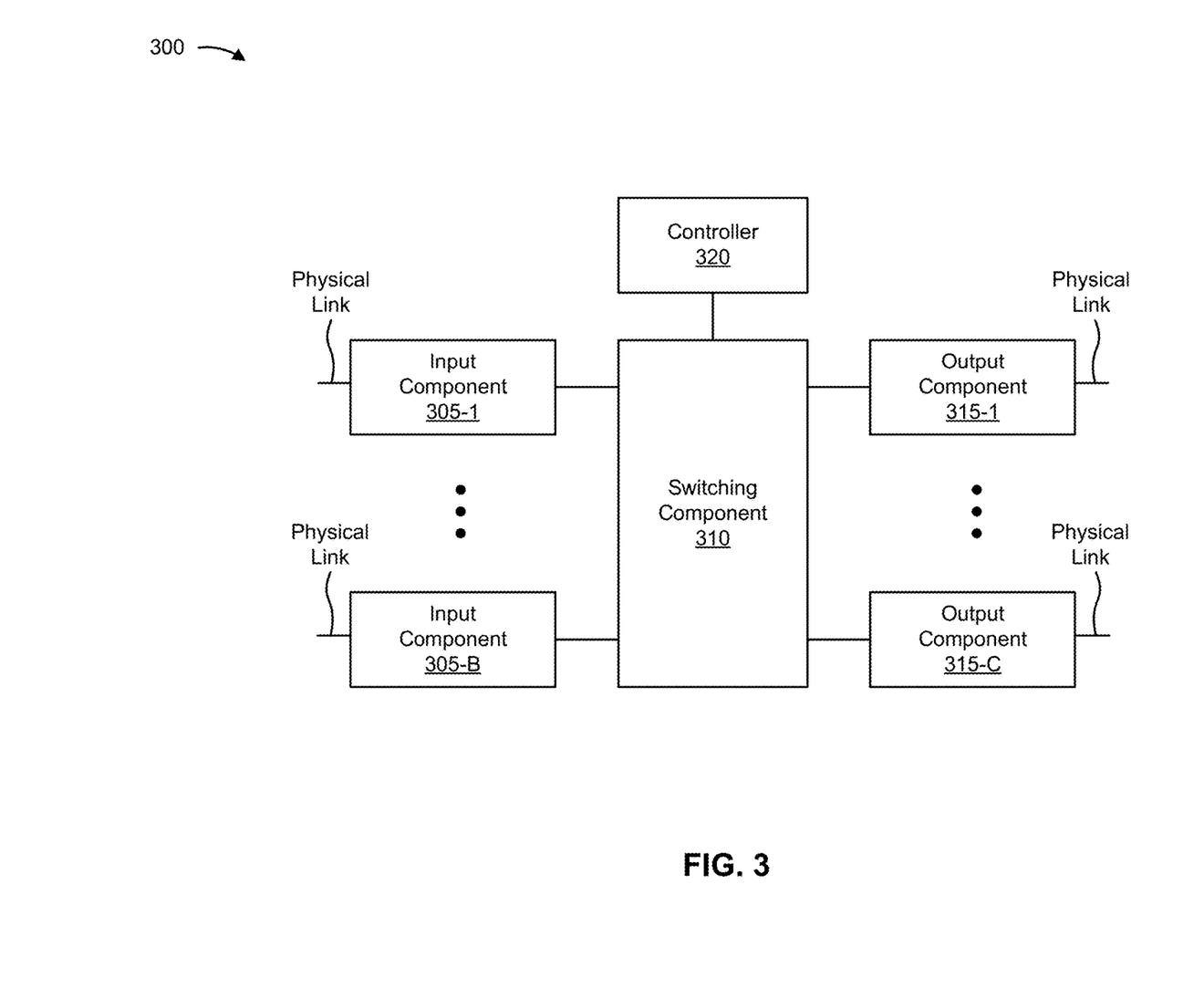
FIG. 3 is a diagram of example components of one or more devices of FIG. 2.

FIG. 3 is a diagram of example components of a device 300. Device 300 may correspond to peer device 210, network device 220, security policy data structure 230, and/or security association data structure 240. In some implementations, peer device 210, network device 220, security policy data structure 230, and/or security association data structure 240 may include one or more devices 300 and/or one or more components of device 300. As shown in FIG. 3, device 300 may include a set of input components 305, a switching component 310, a set of output components 315, and/or a controller 320. In some implementations, components of devices 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
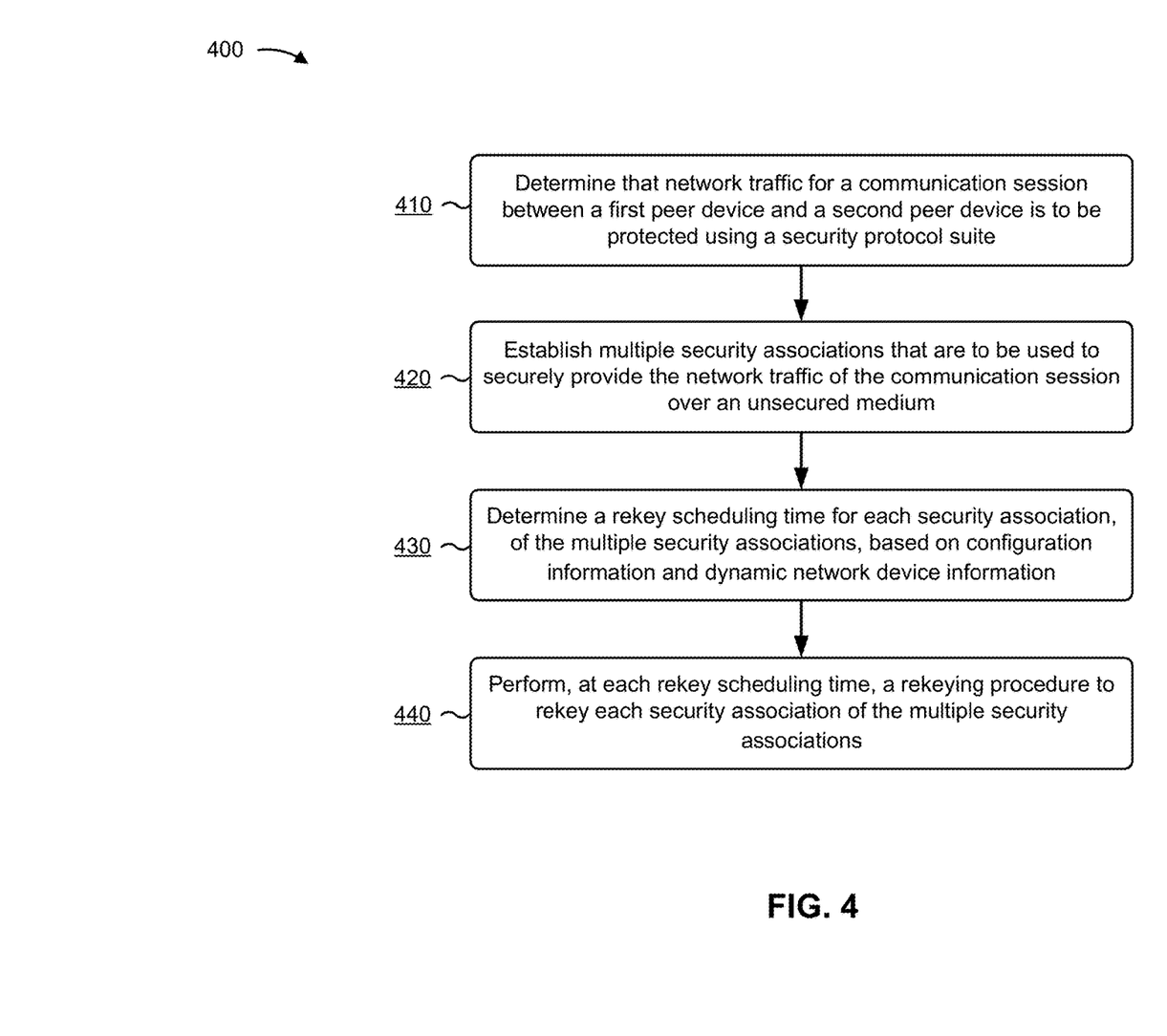
FIG. 4 is a flow chart of an example process for using dynamic information to determine rekey scheduling times to manage a distribution of rekeying procedures for a scaling virtual private network (VPN).

FIG. 4 is a flow chart of an example process 400 for using dynamic information to determine rekey scheduling times to manage a distribution of rekeying procedures for a scaling virtual private network (VPN). In some implementations, one or more process blocks of FIG. 4 may be performed by a first network device 220. In some implementations, one or more process blocks of FIG. 4 may be performed by another device or a group of devices separate from or including a first peer device 210, a second peer device 210, a second network device 220, a security policy data structure 230, and/or a security association data structure 240.

As shown in FIG. 4, process 400 may include determining that network traffic for a communication session between a first peer device and a second peer device is to be protected using a security protocol suite (block 410). For example, a first network device 220 (e.g., controller 320, input component 305, output component 315, and/or the like) may receive, from a first peer device 210, a request to establish a communication with a second peer device 210, which may cause the first network device 220 to determine that network traffic for the communication session is to be protected using a security protocol suite, such as internet protocol security (IPsec).

In some implementations, the first network device 220 may receive the request to establish the communication session. The request may include IP address information (e.g., a source IP address, a destination IP address), port information (e.g., a source port identifier, a destination port identifier, etc.), protocol suite information identifying a particular protocol suite (e.g., an internet protocol security (IPsec) protocol suite), and/or the like.

In some implementations, the communication session may need to be established between peer devices that are located in separate private networks, where the private networks are separated by an unsecured medium. For example, the first peer device 210 may be included in a first network and the second peer device 210 may be included in a second network, where the first network and the second network are private networks separated by an unsecured medium (e.g., a public network, such as the Internet). In this case, a virtual private network (VPN) may be used to support the communication session. Here, the first network device 220 may serve as an edge device for the first network and a second network device 220 may serve as an edge device for the second network, whereby all (or some) network traffic being provided over the unsecured medium may be provided through the edge devices. In some cases, the VPN may support a scaling number of services, such that the first network device 220 and the second network device 220 might support thousands, tens of thousands, or more, communication sessions.

In some implementations, the first network device 220 may determine that network traffic for the communication session is to be protected using a security protocol suite. For example, the first network device 220 may receive the request to establish the communication session, which may include information indicating a particular protocol suite that is to be used to protect the network traffic associated with the communication session. In other cases, the request may not indicate a particular protocol suite, and the first network device 220 may compare the IP address information and/or the port information included in the request to a data structure that associates IP address information and/or port information for network devices 220 with particular security protocol suites.

In this way, the first network device 220 is able to determine that the network traffic for the communication session is to be protected using a security protocol suite.

As shown in FIG. 4, process 400 may include establishing multiple security associations that are to be used to securely provide the network traffic of the communication session over an unsecured medium (block 420). For example, the first network device 220 (e.g., controller 320, output component 315, and/or the like) may, using one or more tunnels, establish multiple security associations (e.g., an internet key exchange (IKE) security association, a pair of IPsec security associations, etc.) that may be used to securely support the network traffic associated with the communication session.

In some implementations, the first network device 220 may establish a first security association, such as an IKE security association. For example, the first network device 220 may perform an IKE Phase 1 procedure to establish a first security association. In this case, the first network device 220 may begin the IKE Phase 1 procedure by performing an authentication procedure with the second network device 220. Here, the first network device 220 and the second network device 220 may perform an authentication procedure where each network device 220 confirms that the other network device 220 has a pre-shared key, a digital certificate, and/or a similar type of authentication information that is available only to network devices 220 that are included in the VPN.

Additionally, the first network device 220 may establish a first tunnel, such as an IKE tunnel. For example, if the authentication procedure succeeds, the first network device 220 may establish a first tunnel with the second network device 220. The first tunnel may be a secure tunnel that is used to negotiate the first security association. The first security association may include security policy information that may be used for establishing a second tunnel that may be used to protect (e.g., encrypt and encapsulate, decrypt and decapsulate, etc.) the network traffic of the communication session. The security policy information may include policy name information, authentication information, encryption information, information relating to a Diffie-Hellman Group, and/or the like.

In some implementations, the first network device 220 may establish, with the second network device 220, a pair of security associations, such as a pair of IPsec security associations. For example, the first network device 220 may perform an IKE Phase 2 procedure to establish the pair of IPsec security associations with the second network device 220. In this case, the first network device 220 may establish a second tunnel (e.g., an IPsec tunnel) with the second network device 220 for sending and/or receiving network traffic of the communication session, and may establish the pair of security associations for protecting the network traffic.

The pair of security associations may each include one or more cryptographic keys that may be used for encryption and/or decryption and/or encapsulation and/or decapsulation of the network traffic associated with the communication session. The pair of IPsec security associations may include a first IPsec security association that is used to secure a first network traffic flow from the first peer device 210 to the second peer device 210, and may include a second IPsec security association that is used to secure a second network traffic flow from the second peer device 210 to the first peer device 210.

In some implementations, the first network device 220 and/or the second network device 220 may store the pair of security associations. For example, the first network device 220 may store the first IPsec security association using security association data structure 240, and the second network device 220 may store the second IPsec security association using security association data structure 240. In this case, each IPsec security association may be stored in association with the IP address information and/or the port information of the first peer device 210 and/or the second peer device 210, thereby allowing the first network device 220 and/or the second network device 220 to identify a proper security association to use when network traffic flow begins.

In some implementations, the first network device 220 may support thousands, tens of thousands, or more, security associations and tunnels concurrently. For example, when the first network device 220 establishes the multiple security associations for the communication session, the first network device 220 may already be supporting security associations for thousands, tens of thousands, or more, security associations and tunnels. Additionally, or alternatively, after establishing the multiple security associations for the communication session, the first network device 220 may establish thousands, tens of thousands, or more, security associations for subsequent communication sessions that may be established.

In this way, the first network device 220 is able to establish multiple security associations that are to be used to securely support the network traffic of the communication session.

As further shown in FIG. 4, process 400 may include determining a rekey scheduling time for each security association, of the multiple security associations, based on configuration information and dynamic network device information (block 430). For example, the first network device 220 (e.g., controller 320, input component 305, output component 315, and/or the like) may determine a rekey scheduling time for each security association using a scheduling optimization technique that uses configuration information and dynamic network device information of the first network device 220. The rekey scheduling time may be a value identifying a time at which to execute a rekeying procedure to establish a new security association for an existing security association.

The configuration information may include a maximum security association duration. The maximum security association duration may be a value indicating a recommended limit on a time that a security association should be used before a rekeying procedure is to be performed. In some cases, the maximum security association duration may be configured based on a value provided in a standard, such as a request for comments (RFC) document.

The configuration information may include a tunnel setup rate. The tunnel setup rate may be a value indicating a number of tunnels (e.g., a maximum number of tunnels) that a network device 220 is capable of performing a rekeying procedure on during a particular time period (e.g., where the rekeying procedure rekeys one or more security associations relating to each tunnel). In some cases, the tunnel setup rate may be specific to a particular type of network device 220 (e.g., a particular type of router, a particular type of hub, a particular type of edge device, etc.). Here, each type of network device 220 may have a benchmarked value indicating a number of tunnels that each type of network device 220 is capable of performing the rekeying procedure on during a particular time period. In some cases, the benchmarked values may be based on device requirements (e.g., device processing capabilities) and/or system requirements (e.g., from a system supporting a particular type of device).

The dynamic network device information may include an active tunnels count. For example, the active tunnels count may be a dynamic value indicating a number of active tunnels being supported by a network device 220. In this case, when the first network device 220 is to determine the rekey scheduling time for a particular security association, the first network device 220 may execute a tunnel counting technique to identify a number of active tunnels being supported by the first network device 220. In some implementations, the active tunnels count may be a value that is greater than a threshold number of tunnels (e.g., greater than 100 tunnels, 500 tunnels, 1,000 tunnels, 5,000 tunnels, 10,000 tunnels, etc.).

In some implementations, the first network device 220 may perform the scheduling optimization technique to determine a rekey scheduling time for a security association. For example, the first network device 220 may determine a total rekey scheduling time by subtracting a total rekey time from the maximum security association duration. The total rekey time may be a time needed to execute a rekeying procedure on all of the security associations associated with active tunnels. In this case, the first network device 220 can determine the total rekey time by dividing the active tunnels count by the tunnel setup rate. Next, the first network device 220 may subtract the total rekey time from the maximum security association duration to determine a total time until a rekeying procedure is to be performed. Additionally, the first network device 220 may add the total time until the rekeying procedure is to be performed to a current time to determine the rekey scheduling time.

As an example, assume a first network device 220 uses a maximum security association duration of five hundred seconds. Further assume that the first network device 220 has a tunnel setup rate of ten tunnels per second, and an active tunnels count of two thousand tunnels. In this example, the first network device 220 may divide the tunnel setup rate by the active tunnel count to determine a total rekey time of two hundred seconds. Additionally, the first network device 220 may subtract the total rekey time from the maximum security association duration to determine a total time until a rekeying procedure is to be performed (e.g., three hundred seconds), and may add the total time until the rekeying procedure is to be performed to a current time to determine a rekey scheduling time (e.g., three hundred seconds after the current time).

In this way, the first network device 220 is able to determine rekey scheduling times using the dynamic network device information, which improves a distribution of rekey scheduling times needed to support a scaling VPN (e.g., by creating a distribution of rekey scheduling times with a larger standard deviation than a distribution of rekey scheduling times that is created using static values). By improving the distribution of rekey scheduling times, the first network device 220 efficiently and effectively utilizes processing and network resources.

In some implementations, the first network device 220 may use a tie-breaker rule to determine a rekey scheduling time. For example, assume the first network device 220 has a tunnel setup rate of ten tunnels per second, and that a group of ten security associations share a rekey scheduling time (e.g., a particular second of the day). Further assume the first network device 220 determines a rekey scheduling time for a new security association that matches the rekey scheduling time of the group of ten security associations. Because rekeying security associations relating to the eleventh tunnel at the particular time period would exceed the amount of rekeys allowed during the particular time period, the first network device 220 may select a next available time period as the rekey scheduling time (e.g., a next-available second of the day).

In some implementations, the first network device 220 may determine a rekey scheduling time using a machine learning model. For example, the first network device 220 may determine a rekey scheduling time for a particular security association by providing information indicating a current distribution of rekey scheduling times as input to a machine learning model. The machine learning model may have been trained on historical data, such as historical rekey scheduling times, historical distributions of rekey scheduling times, and/or the like. In this case, the machine learning model may output a particular rekey scheduling time for the particular security association.

In some implementations, the first network device 220 may determine a rekey scheduling time that is part of a distribution of rekey scheduling times. The distribution of rekey scheduling times may represent all (or some) rekey scheduling times that are currently scheduled. In some implementations, such as when the dynamic network device information is used to determine the rekey scheduling times, the distribution of rekey scheduling times may have a standard deviation that is larger than threshold standard deviation. In some cases, the threshold standard deviation may be set to a standard deviation associated with a distribution of rekey scheduling times that are scheduled using static values.

In some implementations, the first network device 220 may support network traffic for the communication session. For example, the first network device 220 may receive a packet, and may determine that the packet is to be protected using the first IPsec security association. The first network device 220 may make the determination by comparing IP address information and/or port information associated with the packet to a data structure supported by security association data structure 240 (e.g., to identify the first IPsec security association that is stored in association with the IP address information and/or the port information). In this case, the first network device 220 may use information included in the first IPsec security association to protect (e.g., encrypt and encapsulate) the packet for transmission over the unsecured medium.

Additionally, the second network device 220 may receive the protected packet, and may determine that the second IPsec security association is to be used to unprotect (e.g., decrypt and decapsulate) the packet. For example, the second network device 220 may determine that the second IPsec security association is to be used to unprotect the packet by comparing the IP address information and/or the port information associated with the packet to the data structure supported by security association data structure 240 (e.g., to identify the second IPsec security association that is stored in association with the IP address information and/or the port information). In this case, the second network device 220 may provide the packet to the second peer device 210. Furthermore, a similar process may occur for network traffic traveling from the second peer device 210 to the first peer device 210.

In this way, the first network device 220 is able to use a dynamic value to determine a rekey scheduling time for each security association, thereby conserving processing and network resources relative to using a static value to determine a rekey scheduling time for each security association.

As further shown in FIG. 4, process 400 may include performing, at each rekey scheduling time, a rekeying procedure to rekey each security association of the multiple security associations (block 440). For example, the first network device 220 (e.g., controller 320, output component 315, and/or the like) may, at each rekey scheduling time, perform a rekeying procedure to establish a new security association and to determine a new rekey scheduling time.

In some implementations, the first network device 220 may determine to rekey a security association. For example, the first network device 220 may determine to rekey a security association based on a trigger, such as when a current time is equal to a rekey scheduling time for the security association.

In some implementations, the first network device 220 may establish a new security association. For example, at the rekey scheduling time, the first network device 220 may establish a new security association with the second network device 220, in the same manner described above (e.g., by using a new tunnel to establish a new IKE security association, a new pair of IPsec security associations, etc.).

In some implementations, the first network device 220 may determine a new rekey scheduling time for the new security association. For example, network device 220 may determine a new rekey scheduling time for the new security association using the scheduling optimization technique, using the machine learning technique, or using a similar type of technique.

In this way, network device 220 is able to rekey a security association at a rekey scheduling time that is not overscheduled, thereby efficiently and effectively utilizing processing and network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the first network device 220 reduces CPU spikes by reducing a number of intervals where a large number of security associations are being rekeyed, reduces a number of tunnels that may crash while a rekeying procedure is being performed, conserves processing resources that might otherwise be used to execute error correction techniques after a tunnel crashes, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
   determine that network traffic for a communication session between a first peer device and a second peer device is to be protected using a security protocol suite,
      where the network device is in a first network with the first peer device, and
      where the network device is to provide the network traffic over an unsecured medium to another network device that is in a second network with the second peer device;
   establish, with the other network device and by using one or more tunnels of a set of active tunnels, multiple security associations that are to be used to securely provide the network traffic of the communication session over the unsecured medium;
   determine a rekey scheduling time for each security association, of the multiple security associations, based at least in part on an active tunnels count,
      where the active tunnels count is included in one or more of configuration information or dynamic network device information, and
      where the one or more processors, when determining the rekey scheduling time, are to:
         determine, for a security association of the multiple security associations, a total rekey time by dividing the active tunnels count by a tunnel setup rate,
            where the active tunnels count is included in the dynamic network device information, and
            where the tunnel setup rate is included in the configuration information,
         determine, for the security association of the multiple security associations, a total time until a rekeying procedure is to be performed by subtracting the total rekey time from a maximum security association duration,
            where the maximum security association duration is included in the configuration information, and
         determine, for the security association of the multiple security associations, the rekey scheduling time by adding the total time until a rekeying procedure is to be performed to a current time; and
   perform, at each rekey scheduling time, a rekeying procedure to rekey each security association of the multiple security associations.

2. The network device of claim 1,
where the rekey scheduling time for each security association, of the multiple security associations, is part of a distribution of rekey scheduling times, and
where the distribution of rekey scheduling times has a standard deviation that is larger than a preset threshold standard deviation.

3. The network device of claim 1, where the security protocol suite is an internet protocol security (IPsec) protocol suite, and where the multiple security associations include at least one of:
an internet key exchange (IKE) security association,
a first IPsec security association that is to be used to secure a first network traffic flow from the first peer device to the second peer device, or
a second IPsec security association that is to be used to secure a second network traffic flow from the second peer device to the first peer device.

4. The network device of claim 1, where the one or more processors, when establishing the multiple security associations, are to:
 establish, using a first tunnel of the one or more tunnels, a first security association of the multiple security associations,
  where the first security association includes information that is to be used to secure packets associated with a first network traffic flow from the first peer device to the second peer device, and
 establish, using the first tunnel one of the one or more tunnels, a second security association of the multiple security associations,
  where the second security association includes information that is to be used to secure packets associated with a second network traffic flow from the second peer device to the first peer device.

5. The network device of claim 1, where the one or more processors, when determining the rekey scheduling time, are to:
 determine, for a security association of the multiple security associations, a first rekey scheduling time,
  where the security association, of the multiple security associations, is part of a group of security associations that share the first rekey scheduling time,
 determine that a number of tunnels used to support the group of security associations is greater than a number identified by the tunnel setup rate,
 determine a second rekey scheduling time for the security association of the multiple security associations, and
 use the second rekey scheduling time as a time period at which to perform a particular rekeying procedure.

6. The network device of claim 1, where the one or more processors, when using the one or more tunnels to establish the multiple security associations, are to:
 establish a pair of internet protocol security (IPsec) security associations of the multiple security associations; and
 where the one or more processors, when performing the rekeying procedure, are to:
  establish a new pair of IPsec security associations to be used for securing the network traffic associated with the communication session instead of the pair of IPsec security associations, and
  determine a new rekey scheduling time for the new pair of IPsec security associations based on the configuration information and the dynamic network device information.

7. The network device of claim 1, where the tunnel setup rate is a value that indicates a maximum number of tunnels that may be rekeyed by the network device during a particular time period.

8. The network device of claim 1, where the active tunnels count is a value that indicates a total number of tunnels included in the set of active tunnels.

9. A non-transitory computer-readable medium storing instructions, the instructions comprising:
 one or more instructions that, when executed by one or more processors of a network device, cause the one or more processors to:
  determine that network traffic for a communication session between a first peer device and a second peer device is to be protected using a security protocol suite;
  establish, using one or more tunnels, multiple security associations that are to be used to securely provide the network traffic of the communication session over an unsecured medium,
   the one or more tunnels being part of a set of active tunnels that support additional communication sessions;
  determine a rekey scheduling time for each security association, of the multiple security associations, based at least in part on an active tunnels count, where the active tunnels count is included in one or more of configuration information or dynamic network device information, the active tunnels count indicating a total number of tunnels included in the set of active tunnels;
  where the one or more processors, when determining the rekey scheduling time for each security association, are to:
   determine, for a security association of the multiple security associations, a total rekey time by dividing the active tunnels count by a tunnel setup rate,
    where the tunnel setup rate is included in the configuration information,
   determine, for the security association of the multiple security associations, a total time until a rekeying procedure is to be performed by subtracting the total rekey time from a maximum security association duration,
    where the maximum security association duration is included in the configuration information, and
   determine, for the security association of the multiple security associations, a rekey scheduling time by adding the total time until a rekeying procedure is to be performed to a current time; and
  perform, at each rekey scheduling time, a rekeying procedure to rekey each security association of the multiple security associations.

10. The non-transitory computer-readable medium of claim 9, where the one or more instructions, when executed by the one or more processors, further cause the one or more processors to:
 determine the rekey scheduling time for each security association of the multiple security associations,
  where the rekey scheduling time for each security association, of the multiple security associations, is part of a distribution of rekey scheduling times, where the distribution of rekey scheduling times has a standard deviation that is larger than a preset threshold standard deviation.

11. The non-transitory computer-readable medium of claim 9, where the one or more processors are associated with a network device that is in a first network with the first peer device, and where the network device is to provide the network traffic over the unsecured medium to another network device that is in a second network with the second peer device.

12. The non-transitory computer-readable medium of claim 9, where the one or more instructions, that cause the one or more processors to use the one or more tunnels to establish the multiple security associations, cause the one or more processors to:
 establish an internet key exchange (IKE) security association of the multiple security associations; and
 where the one or more instructions, that cause the one or more processors to perform the rekeying procedure for each security association of the multiple security associations, cause the one or more processors to:

establish a new IKE security association to be used for establishing a new tunnel that is to be used to protect the network traffic of the communication session, and determine a new rekey scheduling time for the new IKE security association based on the configuration information and the dynamic network device information.

13. The non-transitory computer-readable medium of claim 9, where the one or more instructions, that cause the one or more processors to use the one or more tunnels to establish the multiple security associations, cause the one or more processors to:

establish a pair of internet protocol security (IPsec) security associations of the multiple security associations; and where the one or more instructions, that cause the one or more processors to perform the rekeying procedure for each security association of the multiple security associations, cause the one or more processors to:

establish a new pair of IPsec security associations to be used for securing the network traffic associated with the communication session, and determine a new rekey scheduling time for the pair of IPsec security associations based on the configuration information and the dynamic network device information.

14. The non-transitory computer-readable medium of claim 9, where the maximum security association duration is a value indicating a limit on a length of time that the security association is to be used before a rekeying procedure is to be performed.

15. A method, comprising:

determining, by a network device, that network traffic for a communication session between a first peer device and a second peer device is to be protected using a security protocol suite;

establishing, by the network device and by using one or more tunnels of a set of active tunnels, multiple security associations that are to be used to securely provide the network traffic of the communication session over an unsecured medium;

determining, by the network device, a rekey scheduling time for each security association, of the multiple security associations, based at least in part on an active tunnels count, where the active tunnels count is included in a combination of configuration information or dynamic network device information;

where determining the rekey scheduling time for each security association comprises:

determining, for a security association of the multiple security associations, a total rekey time by dividing the active tunnels count by a tunnel setup rate, where the active tunnels count is included in the dynamic network device information, and where the tunnel setup rate is included in the configuration information, determining, for the security association of the multiple security associations, a total time until a rekeying procedure is to be performed by subtracting the total rekey time from a maximum security association duration, where the maximum security association duration is included in the configuration information, and determining, for the security association of the multiple security associations, the rekey scheduling time by adding the total time until a rekeying procedure is to be performed to a current time; and performing, by the network device and at each rekey scheduling time, a rekeying procedure to rekey each security association of the multiple security associations.

16. The method of claim 15, where the one or more tunnels are part of a set of active tunnels that each supports multiple security associations, where the dynamic network device information includes the active tunnels count indicating a total number of active tunnels included in the set of active tunnels, and where the active tunnels count is greater than a threshold number of tunnels.

17. The method of claim 15, where determining the rekey scheduling time for each security association comprises:

determining the rekey scheduling time for each security association of the multiple security associations, where the rekey scheduling time for each security association, of the multiple security associations, is part of a distribution of rekey scheduling times, where the distribution of rekey scheduling times has a standard deviation that is larger than a preset threshold standard deviation.

18. The method of claim 15, where the network device is in a first network with the first peer device, and where the network device is to provide the network traffic over the unsecured medium to another network device that is in a second network with the second peer device.

19. The method of claim 15, where determining the rekey scheduling time comprises:

providing, for the security association of the multiple security associations, information indicating a current distribution of rekey scheduling times as input to a machine learning model that has been trained on historical data, the machine learning model to output a particular rekey scheduling time for the security association of the multiple security associations.

20. The method of claim 15, where using the one or more tunnels to establish the multiple security associations comprises:

establishing, using an internet key exchange (IKE) tunnel, an IKE security association of the multiple security associations; and where performing the rekeying procedure comprises:

establishing a new IKE security association to be used for securing the network traffic associated with the communication session, and determining a new rekey scheduling time for the new IKE security association based on the configuration information and the dynamic network device information.

* * * * *

UNITED STATES PATENT AND TRADEMARK OFFICE
CERTIFICATE OF CORRECTION

| | | |
|---|---|---|
| PATENT NO. | : 10,924,274 B1 | Page 1 of 1 |
| APPLICATION NO. | : 15/895773 | |
| DATED | : February 16, 2021 | |
| INVENTOR(S) | : Shibu Piriyath et al. | |

It is certified that error appears in the above-identified patent and that said Letters Patent is hereby corrected as shown below:

On the Title Page

Item (73) change "Assignee: Junioer Networks, Inc., Sunnyvale," to -- Juniper Networks, Inc., Sunnyvale, --

Signed and Sealed this
Fourth Day of May, 2021

Drew Hirshfeld
*Performing the Functions and Duties of the
Under Secretary of Commerce for Intellectual Property and
Director of the United States Patent and Trademark Office*